(12) United States Patent
Goller et al.

(10) Patent No.: US 11,146,102 B2
(45) Date of Patent: Oct. 12, 2021

(54) METHOD AND CONTROL CENTER ARRANGEMENT FOR THE CONTROL OF AN ELECTRICAL ENERGY TRANSMISSION GRID, AND COMPUTER PROGRAM PRODUCT

(71) Applicant: SIEMENS AKTIENGESELLSCHAFT, Munich (DE)

(72) Inventors: Andre Goller, Rednitzhembach (DE); Nenad Lecek, Nuremberg (DE); Markus Reischboeck, Erlangen (DE); Ljiljana Glamocic, Lauf A.D. Pegnitz (DE); Soeren Loesel, Schwanstetten (DE); Henriette Zoeller, Buergstadt (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/924,471

(22) Filed: Jul. 9, 2020

(65) Prior Publication Data

US 2021/0013736 A1 Jan. 14, 2021

(30) Foreign Application Priority Data

Jul. 9, 2019 (EP) .................................... 19185154

(51) Int. Cl.
*H02J 13/00* (2006.01)
*H02J 3/38* (2006.01)

(52) U.S. Cl.
CPC ........ *H02J 13/00001* (2020.01); *H02J 3/381* (2013.01)

(58) Field of Classification Search
CPC ...... H02J 13/00001; H02J 3/381; H02J 13/00; H02J 3/38
See application file for complete search history.

(56) References Cited

U.S. PATENT DOCUMENTS 7,983,799 B2  7/2011 Bose et al.
9,887,545 B2  2/2018 Bamberger et al.
(Continued)

FOREIGN PATENT DOCUMENTS

| EP | 3048687 A1 | 7/2016 |
|---|---|---|
| WO | 2012037989 A2 | 3/2012 |
| WO | 2014067557 A1 | 5/2014 |

OTHER PUBLICATIONS

Wikipedia: "Var (Einheit)"—[Volt-ampere], 2018—English version.
(Continued)

*Primary Examiner* — Robert L Deberadinis
(74) *Attorney, Agent, or Firm* — Laurence A. Greenberg; Werner H. Sterner; Ralph E. Locher

(57) ABSTRACT

An electrical energy distribution grid is controlled by a control center. Power target values for the real power and reactive power at a transfer point between the energy distribution grid and an electrical energy transport grid are prescribed by a target value device. The target values are to avoid backward feed into the energy transport grid that could lead to malfunctions. The real and reactive power target values are compared with current values at the transfer point. When a deviation of the actual values is determined, an optimization calculation is effected for the real power value and the reactive power value in the energy distribution grid to reduce or remove the deviation. The optimization generates switching commands for controllable operating devices, and a control device transmits the switching commands to the operating devices. There is also described a control center arrangement and a corresponding computer program product.

15 Claims, 4 Drawing Sheets

(56) References Cited

U.S. PATENT DOCUMENTS

2010/0025994 A1  2/2010 Cardinal et al.
2015/0340870 A1  11/2015 Ilo

OTHER PUBLICATIONS

Siemens Ingenuity for Life: "Spectrum Power ADMS—The platform to meet your future distribution operation needs", published by Siemens Industry, Inc. 2017, usa.siemens.com/spectrum-power.
I. Dzafic et al.: "Real-time Distribution System State Estimation", IPEC 2010, IEEE 978-1-4244-7398-4.
Wikipedia: "Distribution Management System", 2019.
Eaton: "Integrated Volt/VAR Control—for more efficient, higher quality and less costly power" Yukon energy automation software platform, 2017, Eaton.com/cooperpowerseries.
Power Spectrum: "Back Log Requirement Description BLRD VVC PQ Target Values", Version 0.91, 2017.

FIG 2

Summary (5)

| Subsystem | Status | Date / time | Trigger | Started by | Objective | Controls | Improvement % | Switching order number | Trust factor [%] |
|---|---|---|---|---|---|---|---|---|---|
| /EU-S5/110 kV/IB110_2B | Optimal solution found | 05/24/2019 17:27:08 | Manual | spectrum | Min. target value deviation | Remotely controlled | 95.56 | 0 | 0.00 |
| /EU-S5/110 kV/IB110_2B | Optimal solution found | 05/24/2019 17:26:48 | Manual | spectrum | Min. violations | Remotely controlled | 99.38 | 0 | 0.00 |
| /EU-S5/110 kV/IB110_2B | Optimal solution found | 05/24/2019 17:26:28 | Manual | spectrum | Min. target value deviation | Remotely controlled | 95.56 | 0 | 0.00 |
| /EU-S5/110 kV/IB110_2B | Optimal solution found | 05/24/2019 17:24:06 | Manual | spectrum | Min. target value deviation | Remotely controlled | 36.92 | 0 | 0.00 |
| /EU-S5/110 kV/IB110_2B | Optimal solution found | 05/24/2019 17:23:42 | Manual | spectrum | Min. power losses | Remotely controlled | 40.04 | 0 | 0.00 |
| /EU-S5/110 kV/IB110_2B | Optimal solution found | 05/24/2019 17:23:20 | Manual | spectrum | Min. violations | Remotely controlled | 99.38 | 0 | 0.00 |
| /EU-S5/110 kV/IB110_2B | Optimal solution found | 05/24/2019 17:22:43 | Manual | spectrum | Min. reactive power consumption | Remotely controlled | 47.34 | 0 | 0.00 |
| /EU-S5/110 kV/IB110_2B | Optimal solution found | 05/24/2019 17:21:51 | Manual | spectrum | Min. reactive power consumption | Remotely controlled | 56.73 | 0 | 0.00 |

Objective summary (7)

| | Initial | Final |
|---|---|---|
| Total objective (normalized) | 66.67 | 2.96 |
| Power losses | 0.00 | 0.00 |
| Active power consumption | 0.00 | 0.00 |
| Reactive power consumption | 0.00 | 0.00 |
| Operational costs | 0.00 | 0.00 |
| Revenue | 0.00 | 0.00 |
| Busbar overvoltage sub-objective | 0.00 | 0.00 |
| Busbar undervoltage sub-objective | 0.00 | 0.00 |
| Power factor deviation sub-objective | 0.00 | 0.00 |
| Transformer violations sub-objective | 0.00 | 0.00 |
| Line violations sub-objective | 0.00 | 0.00 |
| Target value deviation P sub-objective | 33.33 | 0.66 |
| Target value deviation Q sub-objective | 33.33 | 2.30 |
| Target value deviation power factor sub-objective | 0.00 | 0.00 |

(8) (6)

| Entry | Resource | Controlled Item | Type | Action | Value | Unit | Effect [%] |
|---|---|---|---|---|---|---|---|
| 1 | /EU-S5/110 kV/T1_V_TCH | /EU-S5/110 kV/T1_V_TCH/Tap Chan | Tap changer | Down | -16.0000 | | 32.91 |
| 2 | /EU-S5/110 kV/T1_V_TCH | /EU-S5/110 kV/T1_V_TCH/Tap Chan | Ramp-up | Ramp-up step | 16.0000 | seconds | 0.00 |
| 3 | /S5F01/33 kV/C2_SC | /S5F01/33 kV/Bay248/CB | Switch | On | 1.0000 | | 27.04 |
| 4 | /S5F01/33 kV/C2_SC | /S5F01/33 kV/Bay248/CB | Ramp-up | Ramp-up step | 1.0000 | seconds | 0.00 |
| 5 | /S5F02/33 kV/VR_V_Vsp | /S5F02/33 kV/B05b33F2/USetpabc | Setpoint | Ramp-up step | 35.8904 | kV | 2.05 |
| 6 | /S5F02/33 kV/VR_V_Vsp | /S5F02/33 kV/B05b33F2/USetpabc | Ramp-up | Ramp-up step | 16.0000 | seconds | 0.00 |
| 7 | /S5F02/33 kV/C2_SC | /S5F02/33 kV/Bay190/CB | Switch | On | 1.0000 | | 33.56 |
| 8 | /S5F02/33 kV/C2_SC | /S5F02/33 kV/Bay190/CB | Ramp-up | Ramp-up step | 1.0000 | seconds | 0.00 |

FIG 3

Summary

| Subsystem | Status | Date / time | Trigger | Started by | Objective | Controls | Improvement % | Switching order number | Trust factor [%] |
|---|---|---|---|---|---|---|---|---|---|
| /EU-S5/110 kV/IB110_2B | Optimal solution found | 05/24/2019 17:27:08 | Manual | spectrum | Min. target value deviation | Remotely controlled | 95.56 | 0 | 0.00 |
| /EU-S5/110 kV/IB110_2B | Optimal solution found | 05/24/2019 17:26:48 | Manual | spectrum | Min. violations | Remotely controlled | 99.38 | 0 | 0.00 |
| /EU-S5/110 kV/IB110_2B | Optimal solution found | 05/24/2019 17:26:28 | Manual | spectrum | Min. target value deviation | Remotely controlled | 95.56 | 0 | 0.00 |
| /EU-S5/110 kV/IB110_2B | Optimal solution found | 05/24/2019 17:24:06 | Manual | spectrum | Min. target value deviation | Remotely controlled | 36.92 | 0 | 0.00 |
| /EU-S5/110 kV/IB110_2B | Optimal solution found | 05/24/2019 17:23:42 | Manual | spectrum | Min. power losses | Remotely controlled | 40.04 | 0 | 0.00 |
| /EU-S5/110 kV/IB110_2B | Optimal solution found | 05/24/2019 17:23:20 | Manual | spectrum | Min. violations | Remotely controlled | 99.38 | 0 | 0.00 |
| /EU-S5/110 kV/IB110_2B | Optimal solution found | 05/24/2019 17:22:43 | Manual | spectrum | Min. reactive power consumption | Remotely controlled | 47.34 | 0 | 0.00 |
| /EU-S5/110 kV/IB110_2B | Optimal solution found | 05/24/2019 17:21:51 | Manual | spectrum | Min. reactive power consumption | Remotely controlled | 56.73 | 0 | 0.00 |

Subnetwork information

| | Initial | Final |
|---|---|---|
| Busbar overvoltage | 0.00 | 387.37 |
| Busbar undervoltage | 1,352.68 | 0.00 |
| Power factor deviation | 2.11 | 0.01 |
| Transformer violations | 0.00 | 0.00 |
| Line violations | 0.00 | 0.00 |
| Power losses [kW] | 1,048.28 | 628.55 |
| Injected P [kW] | 25,428.21 | 25,008.51 |
| Injected Q [kVAr] | 17,610.19 | 9,273.35 |
| Revenue [m.u./h] | 12,085.18 | 12,127.15 |
| Operational costs [m.u./h] | 39,833.06 | 21,741.07 |
| Target value deviation P (kW) | 2.14 | 0.04 |
| Target value deviation Q (kVar) | 895.42 | 61.74 |

Violation information

| | Initial | | | Final | | |
|---|---|---|---|---|---|---|
| | Number of violations | Worst violation type | Worst violation [%] | Number of violations | Worst violation type | Worst violation [%] |
| Busbar undervoltage | 32 | Medium | -10.67 | 32 | Short | 0.09 |
| Power factor deviation | 1 | Medium | 3.91 | 1 | Long | 1.16 |

FIG 4

Summary

| Subsystem | Status | Date / time | Trigger | Started by | Objective | Controls | Improvement % | Switching order number | Trust factor [%] |
|---|---|---|---|---|---|---|---|---|---|
| /EU-S5/110 kV/IB110_2B | Optimal solution found | 05/24/2019 17:27:08 | Manual | spectrum | Min. target value deviation | Remotely controlled | 95.56 | | 0.00 |
| /EU-S5/110 kV/IB110_2B | Optimal solution found | 05/24/2019 17:26:48 | Manual | spectrum | Min. violations | Remotely controlled | 99.38 | 0 | 0.00 |
| /EU-S5/110 kV/IB110_2B | Optimal solution found | 05/24/2019 17:26:28 | Manual | spectrum | Min. target value deviation | Remotely controlled | 95.56 | 0 | 0.00 |
| /EU-S5/110 kV/IB110_2B | Optimal solution found | 05/24/2019 17:24:06 | Manual | spectrum | Min. power losses | Remotely controlled | 36.92 | 0 | 0.00 |
| /EU-S5/110 kV/IB110_2B | Optimal solution found | 05/24/2019 17:23:42 | Manual | spectrum | Min. violations | Remotely controlled | 40.04 | 0 | 0.00 |
| /EU-S5/110 kV/IB110_2B | Optimal solution found | 05/24/2019 17:23:20 | Manual | spectrum | Min. reactive power consumption | Remotely controlled | 99.38 | 0 | 0.00 |
| /EU-S5/110 kV/IB110_2B | Optimal solution found | 05/24/2019 17:22:43 | Manual | spectrum | Min. reactive power consumption | Remotely controlled | 47.34 | 0 | 0.00 |
| /EU-S5/110 kV/IB110_2B | Optimal solution found | 05/24/2019 17:21:51 | Manual | spectrum | | | 56.73 | 0 | 0.00 |

Target values

| Injection source | Target value setpoint | Used in VVC | Comment | Unit | Target value | Initial injected power | Final injected power |
|---|---|---|---|---|---|---|---|
| /EU-S5/110 kV/IB110_2B | /EU-S5/110 kV/IB110_2B/Q | ✓ | Considered | kVAr | 8,000.00 | 17,610.19 | 9,273.35 |
| /EU-S5/110 kV/IB110_2B | /EU-S5/110 kV/IB110_2B/P | ✓ | Considered | kW | 25,000.00 | 25,428.21 | 25,008.51 |

Capacitors

| Resource | Controlled item | Used in VVC | Comment | Number of banks | | Cost [m.u.] |
|---|---|---|---|---|---|---|
| | | | | Initial | Final | |
| /S5F01/33 kV/C2_SC | /S5F01/33 kV/Bay248/CB | ✓ | Considered | 0 | 1 | 0.00 |
| /S5F02/33 kV/C2_SC | /S5F02/33 kV/Bay190/CB | ✓ | Considered | 0 | 1 | 0.00 |
| /S5F02/33 kV/C3_V_TCH | /S5F02/33 kV/C3_V_TCH/Tap Chan | ✓ | Considered without effect | 1 | 1 | 0.00 |
| /S5F04/33 kV/C3_V_TCH | /S5F04/33 kV/C3_V_TCH/Tap Chan | ✓ | Considered without effect | 1 | 1 | 0.00 |

METHOD AND CONTROL CENTER ARRANGEMENT FOR THE CONTROL OF AN ELECTRICAL ENERGY TRANSMISSION GRID, AND COMPUTER PROGRAM PRODUCT

CROSS-REFERENCE TO RELATED APPLICATION

This application claims the priority, under 35 U.S.C. § 119, of European patent application EP 19185154, filed Jul. 9, 2019; the prior application is herewith incorporated by reference in its entirety.

BACKGROUND OF THE INVENTION

Field of the Invention

The invention relates to a method for the control of an electrical energy transmission grid by means of a control center arrangement, a control center arrangement, and a computer program product.

Control center software for the control of an energy transmission grid is known from the product brochure "Spectrum Power ADMS—The platform to meet future distribution operation needs", Siemens Industry, Inc. 2017, Article no. EMDG-B935-00-4AUS. A figure on page 11 of the brochure shows how, in the context of a state estimation over the energy distribution grid, voltage band violations, i.e. significant deviations from the rated voltage of the energy transmission grid, can be estimated. These voltage band violations can be counteracted by means of a so-called "volt/var control," i.e. a reactive power compensation by way of suitable reactive power sources such as switchable-tap transformers or the like. The fundamental mode of operation of volt/var control is known from, for example, the Wikipedia article "Distribution Management System" page 3: capacitor banks, grid regulators or transformers with switchable taps for reactive power compensation, for example, are employed.

A method for volt-var control of distribution grids is known from the publication "Volt/Var Control Algorithm for Modern Distribution Management System" von Roytelman et al., IEEE Transactions on Power Systems, Vol. 10, No. 3, August 1995. An "oriented discrete coordinate descent method" is, in particular, proposed for the calculation of an optimized solution for switching actions that optimize a distribution grid to a target function while maintaining boundary conditions such as, for example, predetermined maximum voltages in all grid busbars. Switching actions include, for example, switching capacitors in or out or changing the transformer ratio of a switchable-tap transformer. The target function comprises, for example, a minimum power loss of the distribution grid, preventing pre-defined maximum voltages being exceeded, and a need for the fewest possible number of switching actions.

BRIEF SUMMARY OF THE INVENTION

On the basis of the known ADMS control center software, the object of the invention is to provide a comparatively simple method for the control of an electrical energy distribution grid by way of which malfunctions in a higher-level energy transport grid can be avoided.

With the above and other objects in view there is provided, in accordance with the invention, a method of controlling an electrical energy distribution grid with a control center arrangement, the method comprising:

providing target values with a target value device, the target values including a real power target value and a reactive power target value at a transfer point between the energy distribution grid and an electrical energy transport grid, each of the target values being adapted to the energy transport grid to prevent a backward feed into the energy transport grid that could lead to malfunctions of the energy transport grid; and comparing with a comparison device the real power target value with a current real power value and comparing the reactive power target value with a current reactive power value at the transfer point between the energy distribution grid and the energy transport grid; and if a deviation of the current power values from the target power values is determined in the comparing step, causing an optimization device to perform an optimization calculation for the real power value and the reactive power value in the energy distribution grid in order in each case to reduce or overcome the deviation, and forming with the optimization calculation switching commands for controllable operating devices; and transmitting the switching commands from a control device to the operating devices.

In the sense of the invention, a control center arrangement can, for example, be a so-called "Supervisory Control and Data Acquisition" (SCADA) system. This can, for example, be implemented in control center software such as the above-mentioned ADMS.

A control device is a computer device that issues switching commands, either directly for controllable operating means such as, for example, transformers, or indirectly for the local control devices associated with the respective operating means.

Switching commands can, for example, be intended for the following operating means, in particular when these may be controlled by the control center arrangement as contractually agreed: transformers with switchable taps, batteries, capacitors, power switches, loads/consumer units, generators/energy generators. Photovoltaic installations and wind turbines in particular are possible as energy generators in the distribution grid.

The control center arrangement here comprises, for example, a communication device that is able to receive data telegrams with the respective target values from a control center of the higher-level energy transport grid.

The control device can, further, transmit control commands to operating means, for example in accordance with the IEC 61850 standard or via TCP/IP or Ethernet.

The devices provided according to the invention such as, for example, the target value device, the comparison device and the optimization device can, for example, be software components within a more complex software control center system. They can also be software components implemented in a server device such as, for example, a cloud application. A cloud in the sense of the invention is a system with spatially distributed computers and data storage resources that are connected together via a data network. The said devices can further also be provided as individual computing devices with processing means and data storage means such as, for example, an HDD or an SSD.

The optimization device, for example, performs a volt/var optimization, as is known for energy distribution grids from the ADMS mentioned earlier.

An electrical energy distribution grid is typically a medium-voltage grid with, for example, a rated voltage of 33 kV which supplies, for example, a city or a town. An electrical energy transport grid is typically a high-voltage grid with a rated voltage of, for example, 220 kV or 110 kV. The high-voltage grid and the medium-voltage grid are connected at transfer points that comprise a transformer and further electrical operating means. In many countries such as, for example, Germany, statutory regulations provide for what is known as "unbundling" of the two grids, meaning that different companies must operate the grids. This makes an optimized, coordinated control of the distribution grid level and the transport grid level more difficult.

According to the invention, target values or permissible operating parameters of the distribution grid are specified by the control center of the transport grid at the transfer point to the transport grid. In this way, a problematic backward feed of electrical energy into the transport grid, which can, for example, arise in the presence of high energy generation by regenerative energy sources such as wind turbines and solar installations, is, for example, avoided. Backward feed of this sort can influence the stability of the transport grid. Due to their wide-area responsibility for a large number of consumers, transport grid operators have strict safety specifications for avoiding grid failures. In the context of the invention, transport grid operators can, for example through planning calculations or simulations, propose reliable operating parameters of the distribution grid at the transfer point, and agree them with the distribution grid operator. The control center arrangement of the distribution grid then has the task of maintaining these target values as accurately as possible by means of a volt/var control. For this reason the proposed optimization according to the invention by means of volt/var control is performed exclusively in the distribution grid.

An optimization calculation for voltage (U) and reactive power (Q) is, for example, a volt/var optimization known in the prior art, for example the method described above in the publication by Roytelman et al.

As understood in the invention, a power value or a power is, unless otherwise stated, a real power value or a real power.

In the past, the primary objects of the optimization in the distribution grid were maintaining voltage and power limits within the distribution grid, minimizing real power losses and ensuring reserves (e.g. voltage reserves) for the reliable operation of the distribution grid. With the increasing influence of distributed energy generation, and a reversal of the energy flow direction in the grid thereby entailed, measures for limitation and coordination of the backward feed into the transport grid are becoming ever-more important.

The optimization according to the invention of the distribution grid while maintaining target values (e.g. real power, reactive power and, if relevant, in addition also the power factor) at transfer points from the transport grid to the distribution grid represents an extension of the previous optimization, and thereby addresses the changing requirements on the operation of distribution grids. With this approach, an effective method for the coordination of the distribution grid with the higher-level transmission grid is developed, wherein both the security and the optimum operation of both grids are given adequate consideration.

It is a significant advantage of the present invention that, by means of the reactive power compensation through the operating means, voltage band violations that result from strong variations in the permitted operating parameters can ultimately be counteracted.

In one preferred form of embodiment of the method according to the invention, a power factor target value is provided at the transfer point by means of the target value device, said value being compared to a present power factor by means of the comparison device at the transfer point, wherein the power factor is taken into consideration in the optimization calculation in order to reduce a deviation from the power factor target value. The power factor target value can here be used as an alternative to one of the other two target values, i.e. the real power target value and the reactive power target value. This is possible because, out of the three target values of the power factor target value, real power target value and reactive power target value, only two target values have to be known in order to be able to calculate the third target value in an intermediate step. The target values can thus (alternatively) be stated as:

a) power factor target value and real power target value, or b) power factor target value and reactive power target value, or c) real power target value and reactive power target value.

In one preferred form of embodiment of the method according to the invention, at least one voltage target value is taken into account by means of the optimization calculation for the energy distribution grid, wherein the voltage target value is to be maintained at all measurement points within the energy distribution grid. This is an advantage, since maintenance of voltage limits is important for the operation of any energy grid. Different voltage target values can, for example, be specified for different partial grids. The rated voltage of the energy distribution grid is typically taken into consideration in the optimization calculation as a voltage target value.

In one preferred form of embodiment of the method according to the invention, a permissible range (i.e., interval) with a minimum and a maximum value is formed for each target value. An absolute lower limit and an absolute upper limit for the target value, for example, are provided in this way to the respective measuring point. The specification here can be made by a user, or using preset standard values. This is advantageous, since not every deviation from a permissible value of an operating parameter automatically leads to countermeasures which can in some cases even overcompensate for very small deviations and can thus intensify the problem.

In a preferred form of embodiment of the method according to the invention, the minimum and maximum value are each determined while giving consideration to a deviation of 10% from the target value. This is an advantage, since a range of 20% with 10% deviations has been found to be practical and adequately accurate for regulation.

In another preferred form of embodiment of the method according to the invention, the minimum and maximum value are each determined while giving consideration to a deviation of 3% from the target value. This is an advantage, since 3% has been found to be practical and more accurate for regulation (i.e., closed-loop-control).

In a preferred form of embodiment of the method according to the invention, the present values at the transfer point are based on measurements in the energy distribution grid or on estimations of a state estimation device. A "Distribution System State Estimator (DSSE)" system known from the publication "Real-Time Distribution System State Estimation", Dzafic et al., 2010 IEEE 978-1-4244-7398-4 can, for example, be used as the state estimation device. It is furthermore preferred if the present operating parameters are provided in the method as close as possible to real time. This makes it possible, using the method of the invention, to react rapidly to problematic deviations from the predetermined permissible operating parameters.

In a preferred exemplary embodiment of the method according to the invention, the controllable operating means comprise at least one of the following operating means: capacitors, switchable taps of transformers, grid voltage regulators, intelligent power converters, power switches. This is an advantage, since the said operating means have been tested over long periods for the purpose of performing reactive power compensation in energy distribution grids.

On the basis of the known ADMS control center software, it is a further object of the invention to provide a control center arrangement for the control of an electrical energy distribution grid with which malfunctions in a higher-level energy transport grid can be avoided.

With the above and other objects in view there is therefore also provided, in accordance with the invention, a control center arrangement for controlling an electrical energy distribution grid, the control center arrangement comprising:

a target value device configured to provide a real power target value and a reactive power target value at a transfer point between the energy distribution grid and an electrical energy transport grid, with each of the target values being adjusted to the energy transport grid to prevent backward feed into the energy transport grid that could lead to malfunctions of the energy transport grid; and a comparison device configured to compare the real power target value with a current real power value and to compare the reactive power target value with a current reactive power value at the transfer point between the energy distribution grid and the energy transport grid; and an optimization device that is configured, in the event of a deviation of the current values from the target values, to perform an optimization calculation for the real power value and the reactive power value in the energy distribution grid in order in each case to reduce or overcome the deviation, and to generate switching commands for controllable operating devices as a result of the optimization calculation; and a control device configured to transmit the switching commands to the operating devices.

Various dependent claims illustrate preferred embodiments, which provides for the same or additional advantages as the method.

The invention furthermore has the object of providing a computer program product with the aid of which the method according to the invention can be carried out. The invention achieves this object through a computer program product as claimed, wherein substantially the same advantages result as suggested above for the method according to the invention.

Other features which are considered as characteristic for the invention are set forth in the appended claims.

Although the invention is illustrated and described herein as embodied in a method and control center arrangement for the control of an electrical energy transmission grid and a computer program product, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 shows schematically a first view of a user interface of a control center software;

FIG. 3 shows schematically a second view of the user interface of FIG. 2; and FIG. 4 shows schematically a third view of the user interface of FIG. 2.

DETAILED DESCRIPTION OF THE INVENTION

Figure 1:
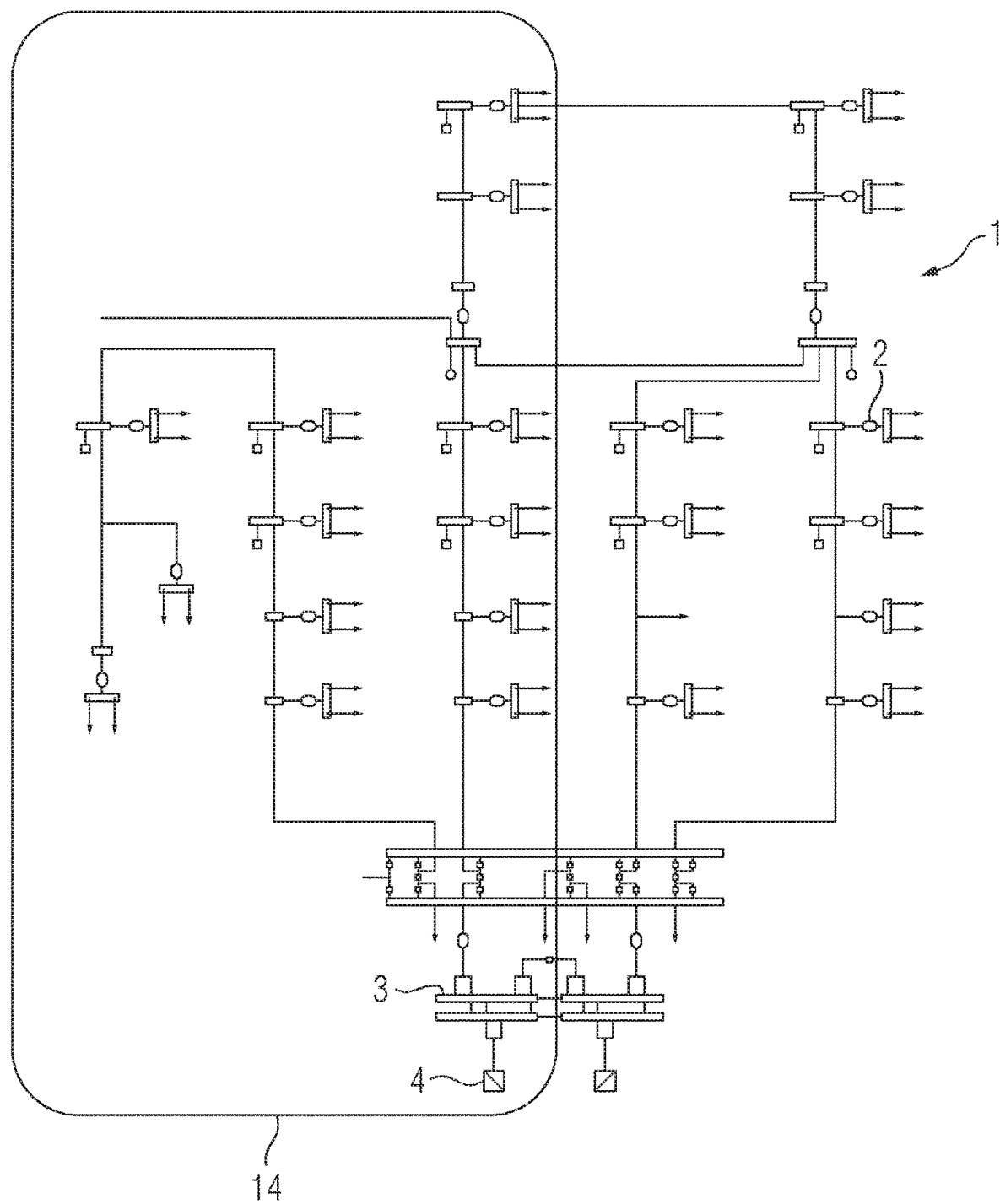
FIG. 1 is a schematic diagram of an example of an energy distribution grid with a transfer point to an energy transport grid.

Referring now to the figures of the drawing in detail and first, particularly, to FIG. 1 thereof, there is shown an energy distribution grid 1 of the medium-voltage level with, for example, 33 kV rated voltage in a single-line illustration, i.e. in a summarized drawing with only one phase (it being assumed that the three phases are symmetrical). Transformers 2 transfer the electrical power to the low-voltage level (not illustrated). A transfer point 3 connects the medium voltage grid 1 with a higher-level energy transport grid 4 of the high voltage level, which has, for example, a rated voltage of 110 kV. In the illustrated example, a partial grid 14 can be outlined which comprises, on the one hand, a high proportion of the energy distribution grid 1 and on the other hand a transfer point 3 to the energy transport grid 4. Target values for real power and reactive power in the partial grid 14 of the energy distribution grid 1 are given for the transfer point 3 by specifications from the grid control center of the energy transport grid 4.

FIGS. 2 to 4 show different views of a graphical user interface for a control center software with which the method according to the invention can be implemented. In the following example, the following values from load flow calculations are assumed for the energy distribution grid at the transfer point according to FIG. 1:

real power P=25428.21 kW reactive power Q=17610.19 kVAr

However, for smooth operation of the higher-level energy transport grid, its control center transmits a target value message from a communication device of the higher-level control center of the transport grid to a communication device of a control center of the distribution grid, wherein the following target values are stated:

P*=25000 kW

Q*=8000 kVAr

The result of this is that the target value for the real power is only slightly exceeded, which in normal operation is usually tolerable, whereas the target value for reactive power is exceeded by a factor of more than two.

As the target function, the topmost line is selected in the "Summary" window, namely "Min. target value deviation". This means that the volt-var calculation according to the invention attempts to control the distribution grid by issuing switching commands to operating means in such a way that the predetermined target values P*, Q* are met as accurately as possible at the transfer point 3. The observance of voltage values etc. is here normally also taken into consideration as a boundary condition.

It is to be highlighted in the window 7, "Objective summary" in FIG. 2, underneath the "Output" tab, that an optimization of the third and second lines from the bottom, namely the "Target value deviation P sub-objective" and "Target value deviation Q sub-objective", have now been significantly improved. According to the "Final" column, the function to be optimized deviates much less than the initial value according to the "Initial" column. The further window 8 shows proposed "switching actions", or the changes resulting from the switching commands. The operating means comprise, in particular, switchable tap transformers ("tap changers") and capacitor banks that are controlled by circuit breakers ("CB").

In FIG. 3, the Details tab is now selected in the window 9. The marking 10 selects the values for P and Q at the transfer point. The target values of the energy transport grid can, through the optimization, now be maintained significantly better ("Final" column):

real power P=25008.51 kW reactive power Q=9273.35 kVAr

While it is true that there is a deviation from the target values of P* and Q*, it is however significantly less than before. In the light of the voltage violations ("Violation information" in window 11) that are also to be taken into account, and the available controllable operating means in the distribution grid, an improved result, or a lower deviation from the target values, could not be achieved in the optimization.

The result is summarized clearly in FIG. 4 in the window 12 "Target values" once again. Four capacitor banks are listed in the window 13, of which the upper two are switched in in the context of the optimization ("considered" and change from "initial" 0 to "final" 1).

The invention claimed is:

1. A method of controlling an electrical energy distribution grid with a control center arrangement, the method comprising:
    providing target values with a target value device, the target values including a real power target value and a reactive power target value at a transfer point between the energy distribution grid and an electrical energy transport grid, each of the target values being adapted to the energy transport grid to prevent a backward feed into the energy transport grid that could lead to malfunctions of the energy transport grid; and
    comparing with a comparison device the real power target value with a current real power value and comparing the reactive power target value with a current reactive power value at the transfer point between the energy distribution grid and the energy transport grid; and
    if a deviation of the current power values from the target power values is determined in the comparing step, causing an optimization device to perform an optimization calculation for the real power value and the reactive power value in the energy distribution grid in order in each case to reduce or overcome the deviation, and forming with the optimization calculation switching commands for controllable operating devices; and
    transmitting the switching commands from a control device to the operating devices.

2. The method according to claim 1, which further comprises providing a power factor target value at the transfer point by the target value device, comparing the power factor target value to a current power factor with the comparison device at the transfer point, and taking the power factor into consideration in the optimization calculation in order to reduce a deviation from the power factor target value.

3. The method according to claim 1, which further comprises taking into account at least one voltage target by way of the optimization calculation for the energy distribution grid, wherein the voltage target value is to be maintained at all measurement points within the energy distribution grid.

4. The method according to claim 1, which further comprises forming for each target value a permissible range with a minimum and a maximum value.

5. The method according to claim 4, which further comprises allowing the minimum and maximum value to deviate from the target value by up to 10%.

6. The method according to claim 1, wherein the current values at the transfer point are based on measurements in the energy distribution grid or on estimations of a state estimation device.

7. The method according to claim 1, wherein the controllable operating devices are selected from the group consisting of: capacitors, switchable taps of transformers, grid voltage regulators, intelligent power converters, and power switches.

8. A control center arrangement for controlling an electrical energy distribution grid, the control center arrangement comprising:
    a target value device configured to provide a real power target value and a reactive power target value at a transfer point between the energy distribution grid and an electrical energy transport grid, with each of the target values being adjusted to the energy transport grid to prevent backward feed into the energy transport grid that could lead to malfunctions of the energy transport grid; and
    a comparison device configured to compare the real power target value with a current real power value and to compare the reactive power target value with a current reactive power value at the transfer point between the energy distribution grid and the energy transport grid; and
    an optimization device that is configured, in the event of a deviation of the current values from the target values, to perform an optimization calculation for the real power value and the reactive power value in the energy distribution grid in order in each case to reduce or overcome the deviation, and to generate switching commands for controllable operating devices as a result of the optimization calculation; and
    a control device configured to transmit the switching commands to the operating devices.

9. The control center arrangement according to claim 8, wherein:
    said target value device is configured to provide a power factor target value to the transfer point;
    said comparison device is configured to compare the power factor target value to a current power factor at the transfer point; and
    said optimization device is configured to take the power factor into consideration in the optimization calculation in order to reduce a deviation from the power factor target value.

10. The control center arrangement according to claim 8, wherein said optimization device is configured to take at least one voltage target value for the energy distribution grid into consideration in the optimization calculation, and wherein the voltage target value is to be maintained at all measurement points within the energy distribution grid.

11. The control center arrangement according to claim 8, wherein said target value device is configured to form a permissible range with a minimum and a maximum value for each target value.

12. The control center arrangement according to claim 11, wherein said target value device is configured to determine the minimum and maximum values in each case to deviate by no more than 10% from the target value.

13. The control center arrangement according to claim 8, further comprising a state estimation device configured to base the present values at the transfer point on measurements in the energy distribution grid or on estimations of the state estimation device.

14. The control center arrangement according to claim 8, wherein the controllable operating devices are selected from the group consisting of: capacitors, switchable taps of transformers, grid voltage regulators, intelligent power converters, and power switches.

15. A computer program product stored in non-transitory form on a data carrier, comprising computer code to be executed on a computing device having a processor and a data storage device to carry out the method according to claim 1.

* * * * *